(12) United States Patent
Taras et al.

(10) Patent No.: US 8,960,522 B2
(45) Date of Patent: Feb. 24, 2015

(54) AUTOMATED BRAZING SYSTEM

(75) Inventors: Michael F. Taras, Fayetteville, NY (US); Zhihui Xiao, Antioch, IL (US); Luis Felipe Avila, Manlius, NY (US); Jeffrey L. Jones, Indianapolis, IN (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 13/995,398

(22) PCT Filed: Dec. 20, 2011

(86) PCT No.: PCT/US2011/066069
§ 371 (c)(1),
(2), (4) Date: Dec. 4, 2013

(87) PCT Pub. No.: WO2012/088057
PCT Pub. Date: Jun. 28, 2012

(65) Prior Publication Data
US 2014/0084043 A1    Mar. 27, 2014

Related U.S. Application Data

(60) Provisional application No. 61/425,410, filed on Dec. 21, 2010.

(51) Int. Cl.
| | | |
|---|---|---|
| B23K 37/00 | (2006.01) | |
| B23K 5/00 | (2006.01) | |
| B23K 1/00 | (2006.01) | |
| B23K 3/04 | (2006.01) | |

(Continued)

(52) U.S. Cl.
CPC . *B23K 5/006* (2013.01); *B23K 1/00* (2013.01); *B23K 1/0012* (2013.01); *B23K 3/043* (2013.01); *B23K 2201/14* (2013.01); *F28F 1/32* (2013.01); *F28D 1/0477* (2013.01); *Y10S 228/902* (2013.01)
USPC .............................. 228/43; 228/183; 228/902

(58) Field of Classification Search
None
See application file for complete search history.

(56) References Cited

U.S. PATENT DOCUMENTS

| 995,017 | A | * | 6/1911 | Keevil | 239/271 |
| 1,590,195 | A | * | 6/1926 | Kerr | 239/543 |
| 1,613,611 | A | * | 1/1927 | Kerr | 239/543 |

(Continued)

FOREIGN PATENT DOCUMENTS

| JP | 56080870 U | 6/1981 |
| JP | 58-128269 A | * 7/1983 |

(Continued)

OTHER PUBLICATIONS

DERWENT-ACC-No. 2010-Q34525KR, which corresponds to KR-2010121732A (Nov. 2010).*

(Continued)

*Primary Examiner* — Kiley Stoner
(74) *Attorney, Agent, or Firm* — Cantor Colburn LLP

(57) ABSTRACT

An automated brazing system by which an apparatus is conveyed along a path defined through a brazing zone is provided and includes first and second sets of burners disposed within the brazing zone at first and second opposing sides of the path, respectively, to heat the components of the apparatus substantially uniformly at the first and second sides and to heat the components of the apparatus substantially uniformly along the brazing zone, such that each side of each of the components is heated to a substantially similar temperature as each side of each of the other components.

10 Claims, 3 Drawing Sheets

(51) Int. Cl.
*F28F 1/32* (2006.01)
*F28D 1/047* (2006.01)

(56) References Cited

U.S. PATENT DOCUMENTS

| | | | | |
|---|---|---|---|---|
| 2,151,334 | A * | 3/1939 | Rockefeller | 228/138 |
| 2,378,001 | A * | 6/1945 | Drummond | 239/536 |
| 2,743,692 | A * | 5/1956 | Wietzel et al. | 228/32 |
| 3,170,228 | A | 2/1965 | Rich | |
| 3,605,255 | A | 9/1971 | Metzger | |
| 3,756,489 | A * | 9/1973 | Chartet | 228/43 |
| 3,861,575 | A * | 1/1975 | Eberle | 228/51 |
| 3,942,704 | A * | 3/1976 | Eberle | 228/58 |
| 3,954,216 | A * | 5/1976 | Eberle | 228/51 |
| 3,981,428 | A * | 9/1976 | Przybylla | 228/175 |
| 4,119,137 | A * | 10/1978 | Eberle | 164/332 |
| 4,256,252 | A * | 3/1981 | Huppunen et al. | 228/56.2 |
| 5,098,006 | A | 3/1992 | McManus | |
| 5,125,555 | A | 6/1992 | Grisoni | |
| 5,195,673 | A | 3/1993 | Irish | |
| 5,205,471 | A * | 4/1993 | Kinose et al. | 228/265 |
| 5,358,169 | A * | 10/1994 | Caddock et al. | 228/180.1 |
| 5,462,216 | A | 10/1995 | Nishimura | |
| 5,549,238 | A | 8/1996 | Hindle | |
| 5,979,741 | A * | 11/1999 | Iguchi | 228/44.3 |
| 6,164,904 | A | 12/2000 | Abriles | |
| 6,422,451 | B2 | 7/2002 | Bendall | |
| 6,471,114 | B2 * | 10/2002 | Pearl et al. | 228/178 |
| 6,502,420 | B2 | 1/2003 | Gupte | |
| 6,605,370 | B2 | 8/2003 | Witterbrood | |
| 6,691,908 | B2 | 2/2004 | Ishida | |
| 6,781,084 | B2 | 8/2004 | Brockman | |
| 6,871,771 | B2 | 3/2005 | Tonjes | |
| 7,219,827 | B2 | 5/2007 | Breznak | |
| 7,293,689 | B2 | 11/2007 | Mayers | |
| 7,414,226 | B2 | 8/2008 | Wang | |
| 7,624,906 | B2 | 12/2009 | Yan | |
| 8,205,784 | B1 * | 6/2012 | Oosthuysen et al. | 228/43 |
| 2004/0056076 | A1 * | 3/2004 | Bostik | 228/234.1 |
| 2008/0296005 | A1 | 12/2008 | Taras | |
| 2010/0096436 | A1 | 4/2010 | Nangle | |
| 2010/0139094 | A1 | 6/2010 | Branyon et al. | |
| 2010/0170669 | A1 | 7/2010 | Jaworowski | |
| 2010/0176106 | A1 | 7/2010 | Christensen | |

FOREIGN PATENT DOCUMENTS

| | | | |
|---|---|---|---|
| JP | 58-152369 U | | 10/1983 |
| JP | 63-248570 A | * | 10/1988 |
| JP | 06-262344 A | * | 9/1994 |
| JP | 9267168 A1 | | 10/1997 |
| JP | 2003039164 A | | 2/2003 |

OTHER PUBLICATIONS

Written Opinion of the International Searching Authority, PCT/US2011/066069, Apr. 10, 2012.

* cited by examiner

AUTOMATED BRAZING SYSTEM

CROSS REFERENCE TO RELATED APPLICATION

This application is a National Stage Application of PCT Application No. PCT/US2011/066069 filed Dec. 20, 2011, which is a PCT Application of U.S. Provisional Patent Application No. 61/425,410 filed Dec. 21, 2010, the disclosures of which are incorporated by reference herein in their entireties.

BACKGROUND OF THE INVENTION

The subject matter disclosed herein relates to an automated brazing system and, more particularly, to an automated brazing system with improved performance and reduced defect rate.

Round tube and plate fin heat exchangers (RTPF) used in air conditioners, heat pumps and refrigeration units generally include a series of long "U"-shaped tubes inserted into a densely arranged pack of fins. The formed tubes, called hairpins, are then circuited (joined) to each other at the opposite end by brazed-in-place return bends. In some cases, straight tubes are used instead, while return bends are brazed at both ends of the tubes. At low production volumes, the tubes are brazed manually. However, such manual brazing process is operator dependant, susceptible to a higher defect rate and unacceptable in the high volume production environments. Therefore, there is cost justification to automate the brazing process when the production rates become sufficiently high.

Since conventional RTPF heat exchangers typically have copper tubes and aluminum fins, the associated brazing process is forgiving due to a wide temperature window between melting points of brazing material and base material of the copper tubes. Brazing automation for aluminum tubes in aluminum tube and aluminum fin RTPF heat exchangers, on the other hand, is new and requires relatively high quality and high precision brazing to assure a leak/defect rate that is comparable to copper/aluminum RTPFs.

BRIEF DESCRIPTION OF THE INVENTION

According to one aspect of the invention, an automated brazing system by which an apparatus is conveyed along a path defined through a brazing zone is provided and includes first and second sets of burners disposed within the brazing zone at first and second opposing sides of the path, respectively, to heat components of the apparatus substantially uniformly at the first and second sides and to heat the components of the apparatus substantially uniformly along the brazing zone, such that each side of each of the components is heated to a substantially similar temperature as each side of each of the other components.

According to another aspect of the invention, an automated brazing system by which an apparatus is conveyed along a path defined through a brazing zone is provided and includes a first set of burners disposed within the brazing zone at a first side of the path to heat components of the apparatus from the first side substantially uniformly along a length of the brazing zone and a second set of burners disposed within the brazing zone at a second side of the path to heat the components of the apparatus from the second side substantially uniformly along the length of the brazing zone, the first and second sides opposing one another and the first and second sets of burners heating the apparatus substantially uniformly at the first and second sides, such that each side of each of the components is heated to a substantially similar temperature as each side of each of the other components.

According to yet another aspect of the invention, an automated brazing system by which an apparatus is conveyed along a path defined sequentially through pre-heating and brazing zones is provided and includes a first set of burners disposed within the pre-heating and brazing zones at a first side of the path to heat components of the apparatus from the first side substantially uniformly along respective lengths of the pre-heating and brazing zones and a second set of burners disposed within the pre-heating and brazing zones at a second side of the path to heat the components of the apparatus from the second side substantially uniformly along the respective lengths of the pre-heating and brazing zones, the first and second sides opposing one another and the first and second sets of burners heating the apparatus substantially uniformly at the first and second sides, such that each side of each of the components is heated to a substantially similar temperature as each side of each of the other components.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects, an automated brazing system design and configuration can reduce costs associated with scrap and repair, while increasing process quality and promoting its extension to more complex multi-row heat exchanger applications.

Figure 1:
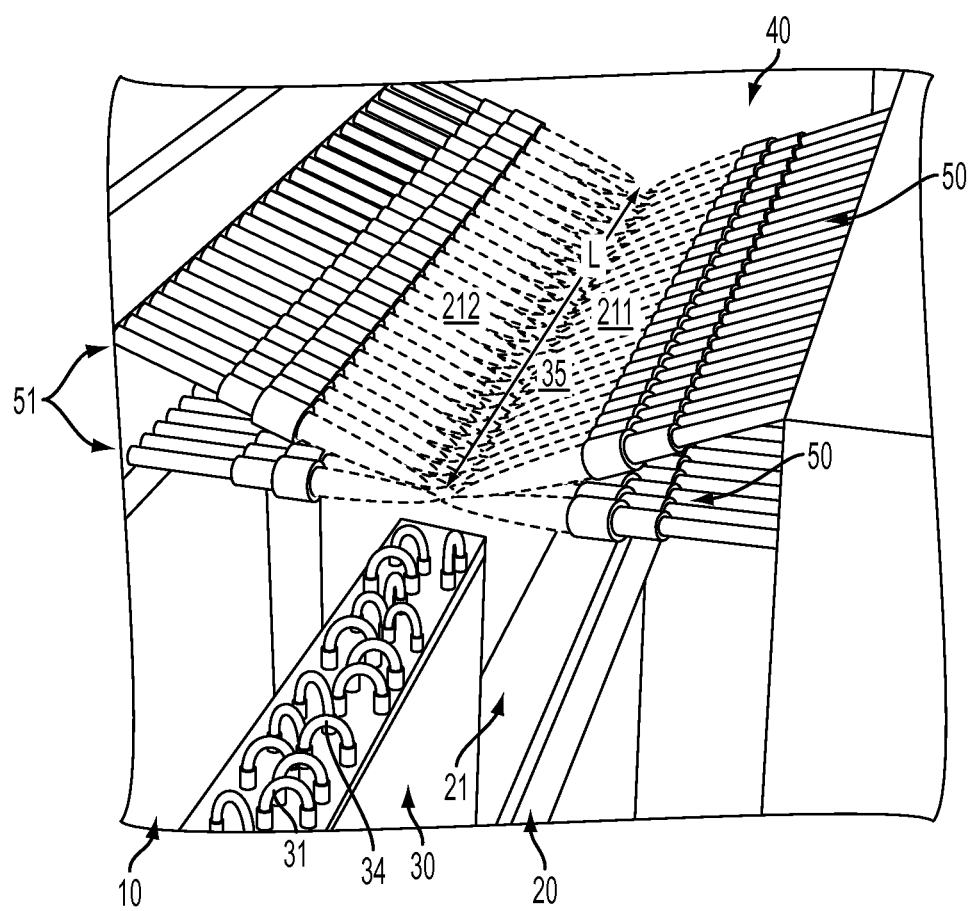
FIG. 1 is a perspective view of an automated brazing system in accordance with embodiments.
Figure 2:
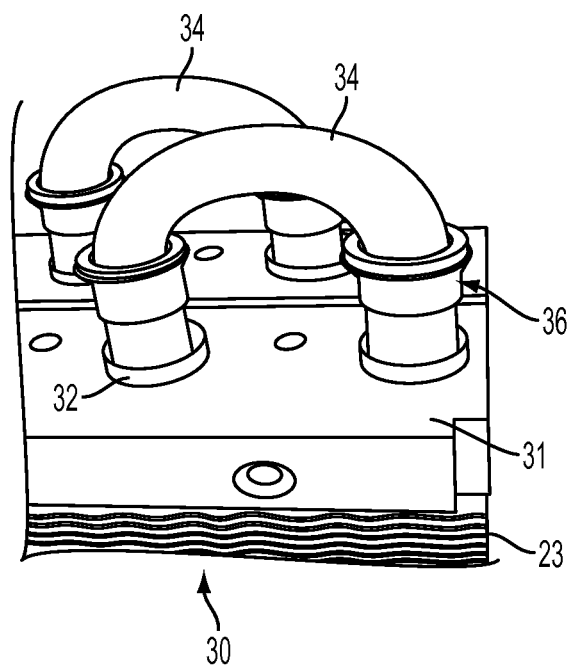
FIG. 2 is a perspective view of return bends of a heat exchanger to be conveyed through the automated brazing system of FIG. 1.

With reference to FIGS. 1 and 2, an automated brazing system 10 is provided and includes a conveyor 20 to convey apparatus 30 along a conveyance path 21 that is substantially straight or, in the case of rotary or curved brazing systems, curved so that the apparatus 30 moves sequentially through a pre-heating zone (see FIG. 3) and a brazing zone 35 of a brazing furnace 40. The brazing zone 35 is maintained with a temperature sufficient for aluminum/aluminum alloy-aluminum/aluminum alloy brazing and the pre-heating zone is maintained at a lower temperature than the brazing zone 35. In this way, with the brazing zone 35 temperature precisely controlled, aluminum components of the apparatus 30 can be joined with other aluminum components of the apparatus 30 efficiently and with reduced thermal damage or/and deformation.

As shown in FIGS. 1 and 2, the apparatus 30 is conveyed along the conveyance path 21 while typically passing the pre-heating zone and the brazing zone 35 in sequence. The brazing spots of the apparatus 30 need to be uniformly and precisely heated to the correct, very narrow temperature range for the brazing alloy to melt and aluminum based components of the apparatus 30 not to be thermally damaged or substantially distorted. Excessively high temperatures will melt or substantially thermally deform the components of the apparatus 30 and lower than desired temperatures may not permit proper melt and flow processes for the brazing alloy to complete the brazing joint without porosity or other defects. The automated brazing system 10 therefore maintains all the brazing spots within the proper temperature range while maintaining the flame velocity field of acceptable uniformity and magnitude.

In accordance with embodiments, the apparatus 30 may include a heat exchanger 31, such as a round tube and plate fin heat exchanger (RTPF) that can be used in air conditioners, refrigeration units and heat pumps. The heat exchanger 31 includes a series of elongate "U"-shaped tubes 32 that are inserted into a densely arranged pack of fins 33. The tubes 32, called hairpins, are then circuited or joined to each other at opposite ends by brazed-in-place return bends 34. The interface 36 between the return bends 34 and the tubes 32 represent the brazing spots at which temperature controls should be maintained as the tubes 32 and the return bends 34 may each include aluminum/aluminum alloy having a narrow temperature range for brazing.

In accordance with alternative embodiments, straight tubes can be used in place of the hairpins without departing from the scope of this application. In these embodiments, brazing of the return bends 34 is performed on both ends of the straight tubes to complete circuiting. This may require moving the heat exchanger 31 through the brazing process twice.

The brazing zone 35 is defined by a first set of burners 50, which are disposed within the brazing zone 35 at a first side 211 of the conveyance path 21. The first set of the burners 50, therefore, heats the apparatus 30 from the first side 211. Moreover, the first set of the burners 50 is configured such that the heating is performed substantially uniformly along a length, L, of the brazing zone 35. The brazing zone 35 is similarly defined by a second set of burners 51, which are disposed within the brazing zone 35 at a second side 212 of the conveyance path 21. The second set of the burners 51, therefore, heats the apparatus 30 from the second side 212. Moreover, the second set of the burners 51 is configured such that the heating is performed substantially uniformly along the length, L, of the brazing zone 35. In addition, the first and second sides 211, 212 oppose one another and the first and second sets of the burners 50, 51 are configured to perform the heating of the brazing joints of the apparatus 30 substantially uniformly at the first and second sides 211, 212.

In this way, each side of at least the end portions of the tubes 32 and each side of the return bends 34 are each heated to substantially similar temperatures for substantially similar periods of time such that the brazing process for each interface 36 proceeds substantially similarly and in accordance with predefined parameters for aluminum/aluminum alloy brazing processes. In addition, as will be discussed below, where the end portions of the tubes 32 and the return bends 34 are provided in multiple rows, each side of at least the end portions of the tubes 32 and each side of the return bends 34 are each heated to substantially similar temperatures for substantially similar periods of time at both the interior rows and the exterior rows. This effect has not been shown in conventional systems whereby a diffuse cloud-like flame is relied upon to heat interior rows.

Figure 3:
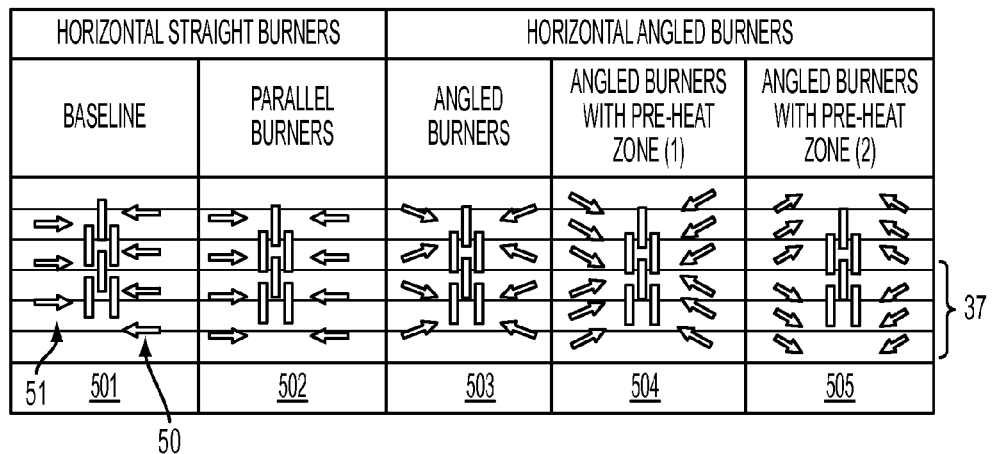
FIG. 3 is a schematic illustration of burner configurations.
Figure 4:
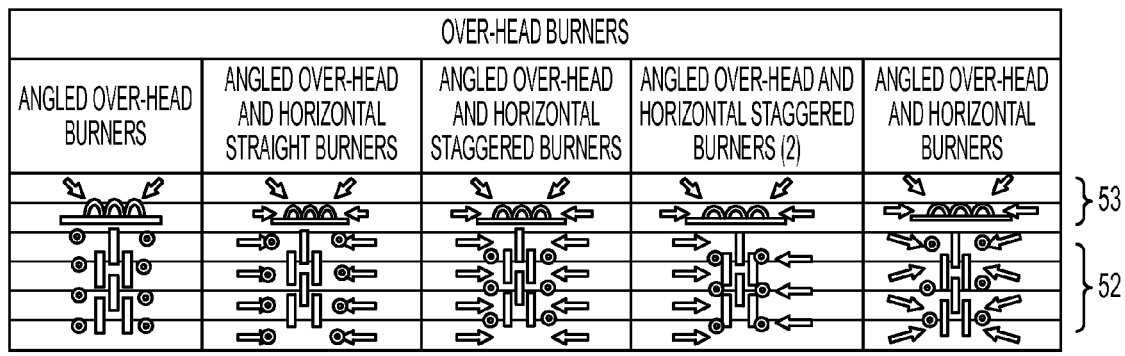
FIG. 4 is a schematic illustration of further burner configurations.

With reference to FIGS. 3 and 4, computational fluid dynamics (CFD) simulations have been used to establish automated brazing system designs and configurations. Methods employing CFD simulate brazing processes and have been validated by test data on a single burner, with respect to burner-to-burner interaction and a burner heating stationary and moving objects as a function of time. Often, the flow field is initially simulated and, later, the temperature field is added into the simulation by incorporating combustion models, transient heat transfer and moving boundary conditions. After validation by experimental setup, CFD models are used to investigate brazing joint temperature changes for different burner system configurations. Several burner system concepts have therefore been analyzed in detail and include those shown in FIGS. 3 and 4.

As shown in FIG. 3, the first and second sets of the burners 50, 51 may be arranged in one or more of a staggered configuration 501, a parallel configuration 502 and an angled configuration 503. Where the angled configuration is employed, a portion of the angled burners 504 or 505 may define a pre-heating zone 37 that is located upstream from the brazing zone 35.

In some cases, the apparatus 30 may be thick and/or a number of rows of tubes 32 and return bends 34 may be large. In these cases, the interior tubes 32 and return bends 34 may require additional heating as provided by additional burners. As shown in FIG. 4, these additional burners may be provided in that each of the first and second sets of burners 50, 51 further includes at least first and second tiers of burners 52, 53 in which the burners of the first tier of the burners 52 are substantially coplanar with one another, the tubes 32 and the return bends 34, and the burners of the second tier of the burners 53 are substantially coplanar with one another but may be off-phase from and/or displaced from a plane of the burners of the first tier of the burners 52, which are arranged similarly as described above. The inclination angle for the first tier burners 52 or the second tier burners 53 can be of any value between 0 and 90 degrees. Also, as a width of the apparatus 30 increases and/or a number of rows of the tubes 32 and the return bends 34 increases, a number of rows of the second tier burners 53 may be increased so that interior regions of the apparatus 30 and/or interior tubes 32 and return bends 34 can be heated substantially uniformly.

In accordance with various embodiments, the burner arrangements described above may be provided in further configurations. The burners may each have burner nozzle diameters of about 2 mm-30 mm. The ratio of the velocity of the conveyance of the apparatus 30 along the conveyance path 21 to the flame velocity may be between about 0.0001 to 0.0012, with a particular range of about 0.0005 to 0.0008, to define a temperature rise through the brazing zone 35 and/or the pre-heating zone 37. The ratio of the distance between burner centerlines and the distance between burner tips and apparatus 30 centerlines may be between about 0.1 to 1, with a particular range of about 0.2 to 0.4, to define a horizontal flame spread and distribution. The ratio of the distance between the first and second tiers of burners 52, 53 to the distance between burner centerlines may be about 0 to 0.5 to define a flame spread, distribution and uniformity in vertical vs. horizontal directions. The ratio of distance between burner centerlines for the staggered configuration 501 and the distance between burner centerlines may be about 0 to 1, with a particular range of about 0.4 to 0.6, to define defines flame spread symmetry. The ratio of the sum of the burner diameter and burner length times the sine of the burner horizontal angle and the distance between burner centerlines may be about 0 to 1, with a particular range of about 0.01 to 0.6, to define horizontal flame uniformity and interaction. The ratio of flame velocity for second tier burners 53 time the cosine of the second tier burner 53 inclination angle and the flame velocity may be about 0 to 2, with a particular range of about 0 to 1.5, to define a flow map and flow field uniformity. The ratio of the distance between the leading edges and heights of the second tier of burners 53 to the leading edges of the first tier of burners 52 may be about 0 to 2, with a particular range of 0.1 to 1, to define flame distribution in the apparatus 30 depth direction. A value of the sine of the second tier burners 53 inclination angle may be about 0.15 to 0.9, with a particular range of about 0.20 to 0.68, to define flame distribution in the return bends depth direction. Finally, the ratio of a burner count in the pre-heating zone 37 to a burner count in the brazing zone 35 may be about 0.2 to 1.3, with a particular range of about 0.3 to 0.8, to define temperature rise profiles and uniformity during brazing processes.

In accordance with further aspects of the invention, a method of operating an automated brazing system 10 is provided and includes conveying an apparatus 30 through a brazing zone 35, heating the apparatus 30 substantially uniformly along a length, L, of the brazing zone 35 and heating the apparatus 30 substantially uniformly on either side of a conveyance path 21 along which the apparatus 30 travels.

The automated brazing system 10 need not be limited to cases in which the apparatus 30 is conveyed along a straight path 21. Indeed, in some embodiments, the automated brazing system 10 can be applicable to an automated rotary or indexing brazing table and, in others, to a robotic arm brazing system. Rotary index tables typically have two to five heat stations and a heat pattern set up so the initial one or two stations define a pre-heating zone and the next several stations progressively heat the part to the brazing temperature. Where a robotic arm brazing system is employed, the brazing operation is accomplished with the use of a torch placed in the end of a robotic arm that can be articulated (i.e. designed with multiple joints), with the motion mechanism driven by electric motors at the joints. There is no limitation on how many torches can be place on the head, such that brazing of multiple points is possible.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An automated brazing system by which an apparatus is conveyed along a path defined sequentially through pre-heating and brazing zones, the system comprising:
    a first set of burners disposed within the pre-heating and brazing zones at a first side of the path to heat component of the apparatus from the first side substantially uniformly along respective lengths of the pre-heating and brazing zones;
    second set of burners disposed within the pre-heating and brazing zones at a second side of the path to heat components of the apparatus from the second side substantially uniformly along the pre-heating and brazing zones,
    the first and second sides opposing one another and the first and second sets of burners heating the apparatus substantially uniformly at the first and second sides such that each of the components is heated to a substantially similar temperature as each side of each of the other components,
    wherein each of the first and second sets of burners comprises at least first and second tiers of burners, the first tier of burners being substantially coplanar and the second tier of burners being substantially coplanar and displaced from a plane of the first tier of burners,
    a first portion of the first tier of burners angled in a first direction and defining the pre-heating zone upstream from the brazing zone and a second portion of the first tier of burners being angled in a second direction away from the pre-heating zone.

2. The automated brazing system according to claim 1, wherein the path is substantially straight.

3. The automated brazing system according to claim 1, wherein the apparatus comprises aluminum and/or aluminum alloy.

4. An automated brazing system by which an apparatus is conveyed sequentially along a path defined through pre-heating and brazing zones, the system comprising:
    first burners disposed at a first side of the path to heat components of the apparatus from the first side substantially uniformly along respective lengths of the pre-heating and brazing zones; and
    second burners disposed at a second side of the path to heat the components of the apparatus from the second side substantially uniformly along the respective lengths of the pre-heating brazing zones,
    the first and second sides opposing one another and each side of each of the components being heated to a substantially similar temperature as each side of each of the other components,
    wherein each of th first and second burners comprises at least first and second tiers of burners, the first tier of burners being substantially coplanar and the second tier of burners being substantially coplanar and displaced from a plane of the first tier of burners,
    a first portion of the first tier of burners being angled in a first direction and defining the pre-heating zone upstream from the brazing zone and a second portion of the first tier of burners being angled in a second direction away from the pre-heating zone.

5. The automated brazing system according to claim 4, wherein the path is substantially straight.

6. The automated brazing system according to claim 4, wherein the apparatus comprises aluminum and/or aluminum alloy.

7. An automated brazing system by which an apparatus is conveyed along a path defined sequentially through pre-heating and brazing zones, the system comprising:
    burners disposed at a first side of the path to heat components of the apparatus from the first side substantially uniformly along respective lengths of the pre-heating and brazing zones; and
    burners disposed at a second side of the path to heat the components of the apparatus from the second side substantially uniformly along the respective lengths of the pre-heating and brazing zones, the first and second sides opposing one another and each side of each of the components being heated substantially similarly temperature as each side of each of the other components, wherein the burners at the first and second sides comprise first and second burner tiers, the first of which are substantially coplanar and the second of which are substantially coplanar and displaced from a plane of the first burner tier, a first portion of the first burner tier being angled in a first direction and defining the pre-heating zone upstream from the brazing zone and a second portion of the first burner tier being angled in a second direction away from the pre-heating zone.

8. The automated brazing system according to claim 7, wherein the path is substantially straight.

9. The automated brazing system according to claim 7, wherein the apparatus comprises aluminum and/or aluminum alloy.

10. The automated brazing system according to claim 7, wherein a brazing zone temperature is maintained at a temperature sufficient for aluminum-aluminum brazing and exceeds a pre-heating zone temperature.

* * * * *